(12) United States Patent
Chilukuri

(10) Patent No.: US 6,354,538 B1
(45) Date of Patent: Mar. 12, 2002

(54) PASSIVE CONTROL OF HOT AIR INJECTION FOR SWIRLING ROTATIONAL TYPE ANTI-ICING SYSTEM

(75) Inventor: Radhakrishna Chilukuri, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/426,411

(22) Filed: Oct. 25, 1999

(51) Int. Cl.$^7$ ................................................ B64D 15/02
(52) U.S. Cl. .................................. 244/134 B; 60/39.093
(58) Field of Search ................................ 244/199, 53 R, 244/134 R, 134 B; 239/265.17; 60/39.093, 35.6; 181/213, 220; 415/119; 416/95

(56) References Cited

U.S. PATENT DOCUMENTS

| | | | | |
|---|---|---|---|---|
| 2,256,393 A | * | 9/1941 | Klein | 244/134 B |
| 2,510,170 A | * | 6/1950 | Chillson et al. | 244/134 B |
| 2,986,002 A | * | 5/1961 | Ferri | 60/35.6 |
| 3,599,876 A | * | 8/1971 | Kyburg | 239/291 |
| 3,685,612 A | * | 8/1972 | Bertin | 239/165.17 |
| 4,175,640 A | * | 11/1979 | Birch et al. | 181/213 |
| 4,688,745 A | * | 8/1987 | Rosenthal | 244/134 R |
| 5,257,498 A | * | 11/1993 | Nikkanen et al. | 60/39.093 |

* cited by examiner

*Primary Examiner*—Galen L. Barefoot
(74) *Attorney, Agent, or Firm*—Baker Botts LLP; Patrick J. Schlesinger

(57) ABSTRACT

An improved anti-icing system for a nose cowl of an aircraft jet engine. An improved injection nozzle is provided to passively enhance the injection of hot, pressure gas from the engine into the ambient air within the nose cowl to entrain such air and cause the entrained mass to rotate within the nose cowl in swirling rotational motion and thereby cause the temperature of the skin of the nose cowl to rise sufficiently to preclude the formation of ice thereon during flight. A plurality of spaced circumferentially arranged tab members, that are preferably triangularly shaped, are canted inwardly slightly to create large scale longitudinal vortices and transverse stirring during the introduction of hot gas and thereby enhance its mixture with the ambient air within the nose cowl and thereby preclude any tendency for the formation of an area of elevated temperature in the skin of the nose cowl downstream of the position of the injection nozzle under certain severe design conditions.

19 Claims, 3 Drawing Sheets

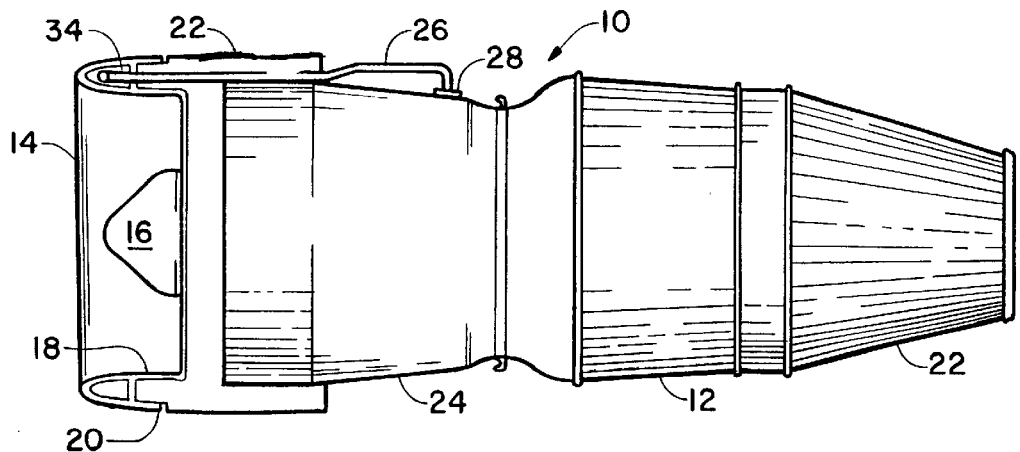
FIG. 1
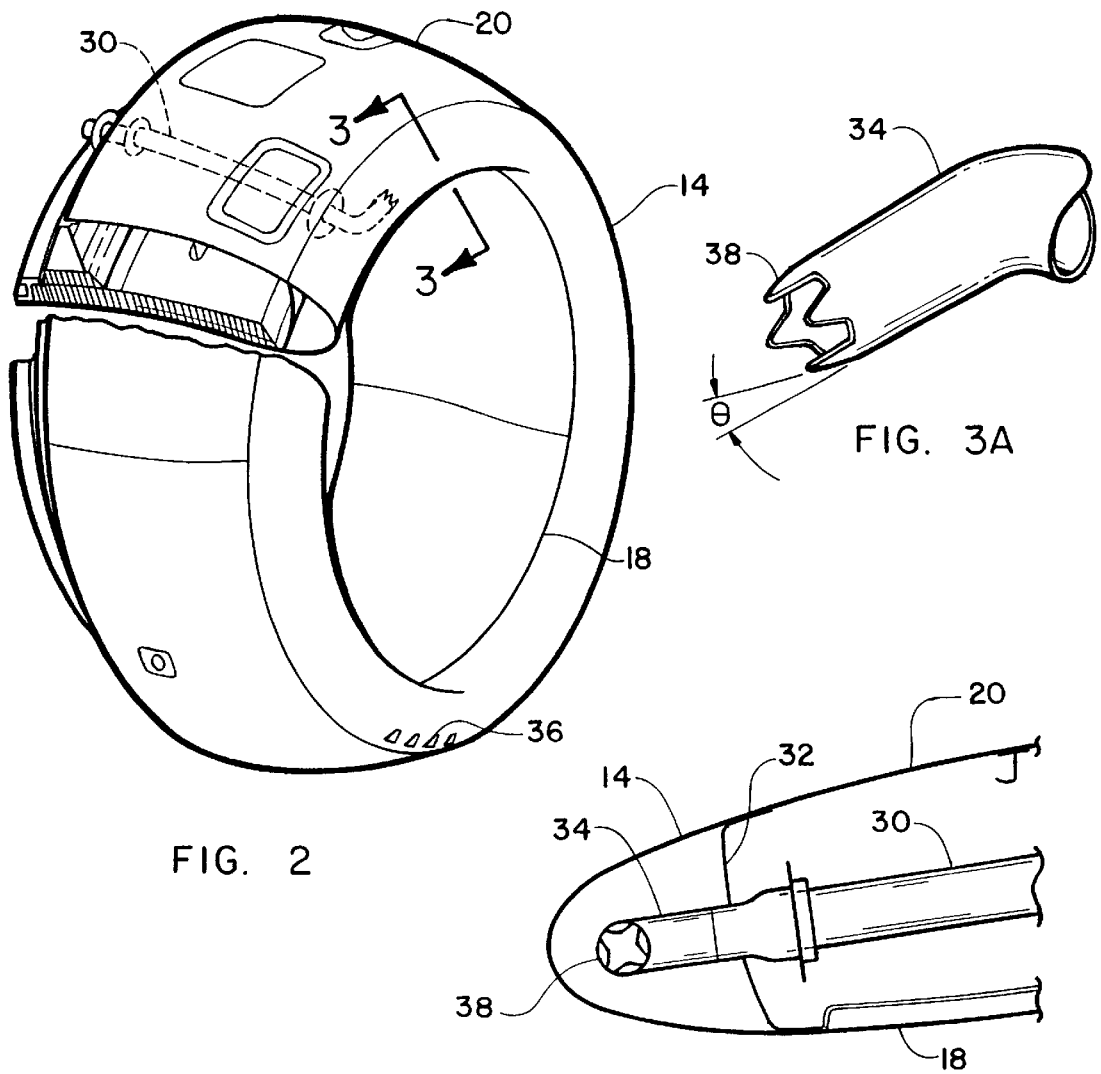
FIG. 2
FIG. 3A
FIG. 3

REDUCTION IN HOT SPOT TEMPERATURE

NOZZLE AREA COMPENSATED FOR TABS

PASSIVE CONTROL OF HOT AIR INJECTION FOR SWIRLING ROTATIONAL TYPE ANTI-ICING SYSTEM

BACKGROUND OF THE INVENTION

1. Field of the Invention

The present invention relates to an improvement in anti-icing systems for aircraft jet engine propulsion systems and more particularly, but not by way of limitation, to an improved method and arrangement for a swirling anti-icing system for an inlet of an aircraft jet engine which provides for improved mixing of the injected hot gas and enhanced pumping of the air within such inlet.

2. Description of the Prior Art

Safety is a primary concern in the design of power propulsion systems for aircraft applications. The formation of ice on aircraft wings, propellers, air inlets of engines, etc. has been a problem since the earliest days of heavier-than-air flight. Any accumulated ice adds considerable weight, and changes the airfoil or inlet configuration making the aircraft much more difficult to fly and in some cases has caused loss of aircraft. In the case of jet aircraft, large pieces of ice breaking loose from the leading edge of an engine inlet housing can severely damage rotating turbine blades or other internal engine components and cause engine failure.

Many attempts have been made to overcome the problems and dangers of aircraft icing. The inlet area of nacelles for aircraft propulsion systems have been the focus of a significant amount of research and development within the aircraft industry. For example, proposals have been made, as described in U.S. Pat. No. 2,135,119 to mechanically vibrate external surfaces to break ice loose or, as described in U.S. Pat. No. 3,549,964, to generate electro-magnetic pulses in the aircraft skin to break ice loose. These systems, however tend to be heavy and complex and to only remove existing ice, rather than prevent ice formation.

Heating areas of the aircraft prone to icing has been suggested many times. The heating schemes suggested range from microwave heating as suggested by U.S. Pat. No. 4,060,212 to feeding hot gases through holes in the skin, as suggested by U.S. Pat. No. 4,406,431, to resistance heating of the surfaces, as in U.S. Pat. No. 1,819,497, to actually burning fuel adjacent to ice-prone surfaces, as described in U.S. Pat. No. 2,680,345. While each of these methods have some advantages none had been truly effective.

One of the most common anti-icing techniques has been the ducting of hot gases into a housing adjacent to the likely icing area. Typical of the patents describing such hot gas techniques are U.S. Pat. Nos. 3,057,154; 3,925,979; 3,933,327 and 4,250,250. In each case, the hot gas conduits simply dump hot gases into a housing, such as the leading edge of a jet engine housing or a wing leading edge. While often useful, these systems are not fully effective due to the complexity of the hot gas duct system.

A typical design for a transport aircraft engine nose cowl ice protection system was the double skin, spray bar configuration which employed an annular duct installed within the nose cowl "D-duct" space. Hot air jets issuing from small orifices, or piccolo holes, on the spray tube were directed onto the entrance into the D-duct into double skin passages along the upper and lower lip surfaces, away from the high-light portion of the nose lip. Hot air was then forced to flow through narrow gaps between the outside skin and the inner skin, transferring heat to the outer skin. While some heat effectiveness was achieved by the double skin design it was at the expense of high manufacturing cost and weight penalty, associated with the required chem-milling process to produce the inner skin and to provide the spray tube arrangement.

A substantial advance in anti-icing systems was made in U.S. Pat. No. 4,688,745 entitled "Swirl Anti-Ice System" and issued to Rosenthal. This patent provided for the circulation of heated gases within the circular leading edge of a jet engine housing in a rotational swirling motion to prevent ice build up thereon. Hot gas, such as air from a hot, high pressure section of the jet engine was directed to the D-duct inlet interior through a conduit that enters the annular leading edge housing through a bulkhead closure. The conduit is then turned about 90° to a direction tangential to the center line of the leading edge annulus. The hot gases exiting an injection nozzle provided as an outlet of such conduit entrain the cooler air in the circular leading edge and cause the much larger mass of air to swirl circularly around the interior of the D-duct of the annular housing. The entering hot gas heats the mass of air to an intermediate but still relatively hot temperature which then uniformly transfers heat to the skin of the leading edge without leaving any relatively cold areas and preventing the formation of ice on the inlet lip. A fraction of entrained heated air equal to the flow rate of injected hot gas is exhausted from such housing.

While this anti-icing system represented a significant advancement over the prior art and has been widely accepted in the aircraft industry, there are areas of the system that could be improved. It has been found that as the jet nozzle injects a flow of under-expanded hot air into the annular nose cowl or nose lip of the inlet that the complete mixing of the two masses of air is somewhat delayed during the rotational swirling action and results in a "hot spot" or area of elevated temperature on the outer lip skin of the nose lip at a position downstream of such injection. This area of elevated temperature in the noselip then presents a constraint in the design of an anti-icing system according to teachings of such patent since such design must take into account such actual conditions such as a day having an elevated ambient temperature, a low altitude location for the aircraft that is to take-off, a high engine power setting, and a failure to an open position of an anti-ice valve provided in the conduit supplying hot gas from the engine as required.

Thus, there is a continuing need to improve aircraft engine housing icing prevention and to particularly improve the anti-icing system of U.S. Pat. No. 4,688,745 by enhancing the mixing of the injected hot gas and the mass of swirling air contained within the D-duct noselip of an aircraft jet engine housing and to improve the performance of the anti-icing system and to lessen design constraints imposed by the area of elevated temperature in the nose lip downstream of the point of injection of the hot gas.

It is a general object of this invention to provide an improved swirling rotational anti-icing system for the nose cowl of a transport aircraft jet engine which enhances the mixing of injected hot, high pressure gas with the larger mass of air within the nose cowl.

It is a further general object of this invention to improve the mixing of hot, pressure gas with the mass of air within the nose cowl and thereby materially reduce any tendency for the injection of such hot, high pressure gas to create an area of elevated temperature in the nose lip at a position downstream of the injection of such hot gas under severe design conditions.

A further general object of the invention is to enhance the pumping action that the injected hot gas has on the ambient air within the nose cowl.

A still further general object is to enhance the circumferential uniformity of noselip temperature and noselip heat rejection to improve the anti-icing efficiency and to prevent ice accumulation on the exterior of the noselip upstream of the point of hot gas injection.

Another general object of the invention is to enable reduction in the noselip cross sectional area and to thereby increase the effectiveness of engine noise attenuation by the inlet by permitting a greater area of sound attenuating structure to be used in the inner barrel of the air inlet.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates overcoming the above noted problems of the prior art and others by the anti-icing system of the present invention which also further improves upon the performance of the generally accepted previous highest standard for an anti-icing system. The present invention contemplates at least one conduit means which directs hot gas from a source of hot, high pressure gases, such as a hot high pressure region of a jet engine to an annular single skin housing or nose lip of the air inlet of an aircraft engine, the air inlet having an acoustically treated inner barrel. The hot gas conduit enters the nose lip through a transversely arranged bulkhead and then is immediately bent approximately 90° and further shaped as a nozzle so as to inject a high speed hot gas jet into the mass of air within such housing at a high velocity substantially along a tangent to the nose lip interior. The arrangement of the nose lip and bulkhead is sometimes referred to in the art as a "D-duct." The outlet nozzle of the conduit is provided with a plurality of circumferentially arranged triangularly shaped tabs that extend aft from the nozzle and are canted inwardly into the exiting flow of hot air to create large scale longitudinal vorticity or transverse stirring aspect to the exiting flow of hot air.

This turbulent flow of injected hot air then mixes more quickly than in the past with the larger mass of lower velocity air in the housing and begins to entrain the larger air mass and brings the velocity of hot gas and air to an intermediate velocity. Likewise, heat is transferred from the injected flow of hot air to the larger mass of air to bring the resultant intermixed flow of rotating swirling flow of air up to an intermediate, but still high, temperature. In effect, energy is conserved by trading high velocity and high temperature in the small mass of injected hot gas for lower velocity and a slightly lower temperature in a larger mass of air/hot gas mixture which still has a temperature sufficiently high to relatively uniformly heat the skin of the noselip to a temperature which precludes the formation of ice on the external surface of the nose lip.

Thus, the improved mixing of the hot gas and the mass of internal air also precludes the formation of an area of unduly elevated temperature on the nose lip at a position downstream of the injection of hot gas and precludes formation of an area of unduly cold temperature on the noselip at a position upstream of the injection of hot gas and improves uniformity of heat rejection around the D-duct circumference. An outlet means is provided in the nose lip bulkhead construction to permit the exhaust of a flow of mixed air from the D-duct that is equal to the flow of hot air injected into such housing. An alternative outlet means and presently preferred structure is to provide an outlet means through slots provided in the noselip itself, preferably at the bottom outer portion of such noselip. This construction has been found to be a very efficient and simple anti-icing system that improves the effective heat transfer that takes place from the large mass of heated moving air to the D-duct wall while retaining mechanical simplicity. There are no moving mechanical parts or electrical parts to jam or burn out.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a schematic elevation view, partially in section, of a conventional gas turbine or jet engine showing the anti-icing system of the present invention.

FIG. 2 is a schematic perspective, partially in section, of an annular air inlet for a jet engine illustrating the location of the anti-icing system of the invention.

FIG. 3 is a partial section taken along lines 3—3 of FIG. 2 to illustrate the novel hot gas nozzle of the invention.

FIG. 3A is a detail perspective further illustrating the nozzle of FIG. 3.

Similar numerals refer to similar parts in all FIGURES.

DETAILED DESCRIPTION OF THE PREFERRED EMBODIMENT

Figure 4:
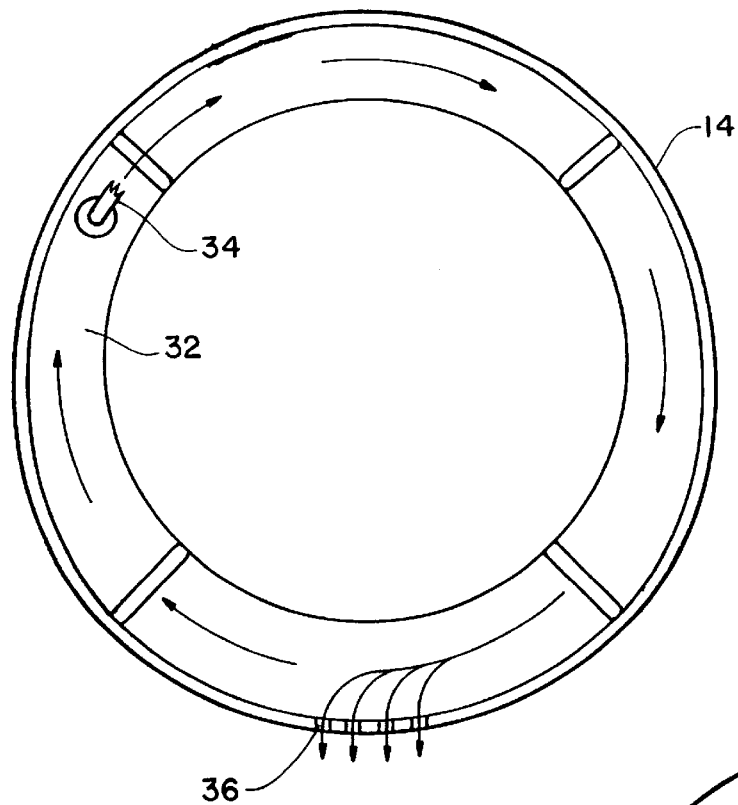
FIG. 4 is a schematic section of the nose lip of FIG. 2 that illustrates the injection of hot gas into the inlet and the rotational swirling mixed flow.

Referring now to the drawings in detail and in particular to FIG. 1, there is seen a schematic representation of a jet turbine engine 10 of the type suitable for aircraft propulsion. The turbine engine 10 is housed within a central housing 12. Air enters the engine 10 through an air inlet section 20, between the spinner 16 of the engine and the nose lip or annular single skin housing 14 which constitutes the forward most section of the air inlet 20 of the engine nacelle, some of which components have been omitted from the Figure for purposes of ease of understanding. Engine thrust is produced by burning incoming air and fuel within the central housing 12 and passing the hot, high pressure propulsion gases through exhaust outlet 22 and out the rear of the engine.

In flight, under "icing conditions", ice tends to form on the nose lip 14 (in addition to other aircraft components not being considered here). The ice changes the geometry of the inlet area 18 between the nose lip 14 and the spinner 16, adversely affecting the required quantity, flow path and quality of incoming air. The inlet area 18, termed the "inner barrel", is preferably acoustically treated. Also, pieces of ice may periodically break free from these components and enter the engine, damaging rotor blades and other internal engine components. This invention is concerned with preventing the accumulation of ice on the surface of the annular housing 14 and with minimizing design constraints associated with the utilization of a swirling rotational anti-icing system. Other techniques may be used with the spinner 16 and other aircraft parts, such as control surfaces, and the like.

Within the compressor section 24 of the jet engine 12 there is a region containing unburnt, hot, high pressure gases. A suitable conduit means 26 or tube is connected at a first end 28 to that hot, high pressure region. The other end 30 penetrates a bulkhead 32 that substantially closes the nose lip 14 to form the D-duct to enclose a quantity of air with the annular space created by such bulkhead 32 and the nose lip 14. In some prior art ice prevention methods, the tube simply terminates at this point, serving to deliver hot gases into the annular space. At times in prior art systems such hot, high pressure gas was delivered to what is termed a "piccolo tube" system for distributing hot gas though apertures in a tube to the vicinity of the leading edge of a nose lip. Even with complex, heavy, ducting within the annular housing, heating of the nose lip was not uniform with some hot spots and other cold spots which tended to accumulate ice. Sometimes a large number of tubes were used in order to bring more hot air forward. The additional tubes added considerable weight and still allowed hot and cold areas in the nose lip.

Figure 6:
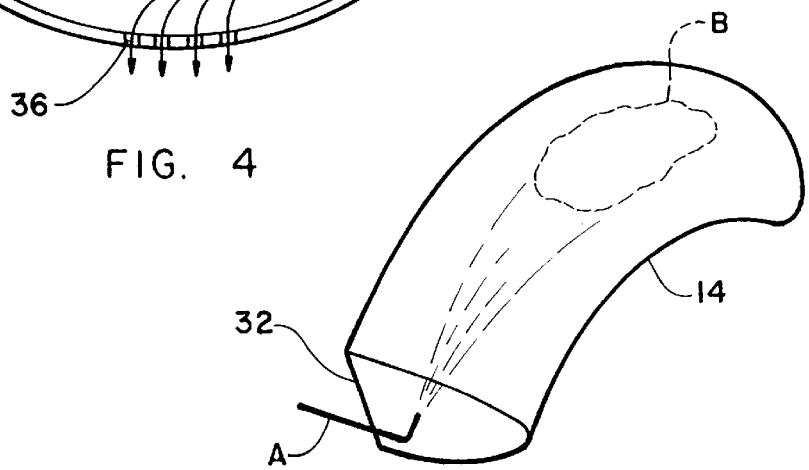
FIG. 6 is a schematic perspective of a portion of a hot gas injection nozzle of the prior art and creation of an area of elevated temperature in the nose lip a location aft of the injection of hot gas by the nozzle.
Figure 5:
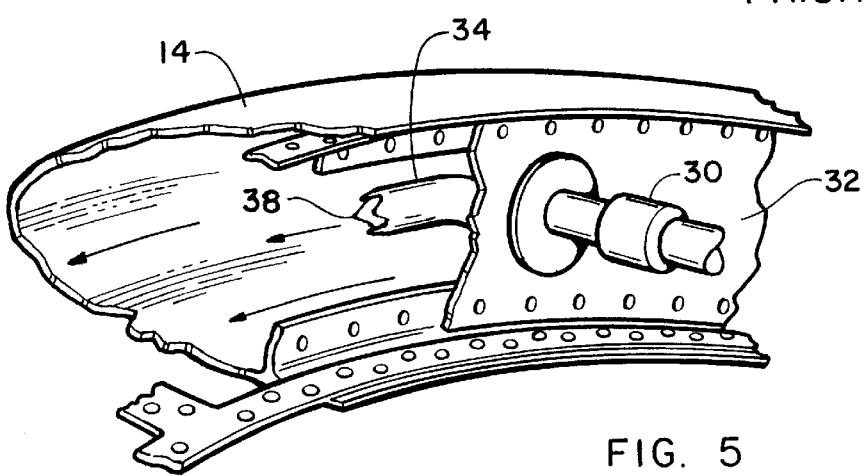
FIG. 5 is a schematic perspective of the details of the nose lip leading edge showing details of the hot gas injection nozzle.

Referring momentarily now to FIG. 6, as exemplary of the swirl anti-icing system of U.S. Pat. No. 4,688,745 of the prior art, the disclosure of which patent is incorporated by reference, in which it will be seen that a nose lip 14 is closed by a bulkhead 32 and a nozzle "A" which extends outwardly from the bulkhead 32 in a direction that is parallel to the centerline of the bulkhead 32 and then in a direction that is approximately 90° tangential to such centerline. The nozzle A then injects a flow of hot high pressure gas from the engine into the mass of air within the housing 14 and entrains it in a rotational swirling motion. The hot temperature gas then mixes with the mass of gas within the housing 14 to increase the mixed flow to an elevated intermediate temperature which is sufficient to preclude the formation of ice on the leading edge of the annular housing 14. A suitable exhaust means is provided to permit a quantity of intermediate temperature air, that is equal to the amount of hot gas injected into the housing 14 by the nozzle A, to escape from the housing 14. Such an anti-icing system, as seen in FIG. 6, while superior to any other anti-icing system for an aircraft engine thereto before known, is subject to several design constraints.

While the nozzle A does entrain the ambient quantity of air contained within the housing 14 in a rotational swirling movement, such entrainment is not immediate and in certain applications the heat of the injected hot gas may not be immediately transferred to the entrained air and may to tend to create an area B in the nose lip 14 that has an elevated temperature with respect to the remaining portion of the nose lip 14. For example, an exemplary temperature for the injected hot gas may be around 1000° F. while the temperature of the entrained rotational swirling hot gas and air mixture may be around 400° F. Thus, this area of elevated temperature or "hot spot" operates as a design constraint when designing the anti-icing system and the elements of the air inlet 18. For example, the inlet 18 and the nose lip, among other components, must be designed to operate in an acceptable manner under such simultaneously occurring conditions for the aircraft as a hot day, low altitude of the airfield, imposition of take-off power for the aircraft, and with the failure of a valve imposed in the hot gas conduit 30 so as to permit that hot gas to flow into housing 14 under all conditions (not just a desired anti-icing flight condition).

Referring now to FIGS. 2–5, the primary novel feature of my invention is illustrated. In FIGS. 2, 3 and 3A it will be seen that it will be seen that the conduit 30 carrying the hot, high pressure gas from the compressor section of a jet engine 10 extends through the bulkhead 32 that closes off the annular nose lip 14 of the inlet 18 to create an annular chamber filled with air. The conduit 30 has an outlet nozzle 34 connected to its outlet end, which nozzle 34 is preferable bent substantially 90° so that the very end of the outlet nozzle 34 is approximately tangent to the centerline of the annular nose lip 14.

The very end of the outlet nozzle 34 is then provided with a plurality of circumferentially spaced longitudinally extending means that extend into the hot air jet stream being ejected from the nozzle 34 to provide vortices in such hot air stream to provide a predetermined vorticity to the hot air stream and thereby promote the more rapid mixing and better entrainment of the ambient mass of air within the nose lip 14 by such hot air stream. Thus, the mixing of the injected hot gas stream into mass of air contained within the housing 14 is materially enhanced. It will be recognized that the injection of such hot gas stream into the housing air will, as seen in FIG. 4, cause the entrained mass of air to rotate within the housing 14 in a swirling rotational direction. Also, as seen in FIGS. 2 and 4, as the mass of entrained air rotates within the housing 14 a suitable exhaust means, shown as suitably sized slots 36 formed in an outboard position of the nose lip 14, permit a portion of such entrained air to escape the housing equal to the mass flow rate of hot gas being injected into the housing to maintain an equilibrium of flow.

It will be recognized that as the hot gas is emitted from the enhanced nozzle 34 the hot gases rapidly mix with the ambient air in the noselip, accelerating the entire air mass to move circularly in the circular direction seen in the FIGURES and to rapidly reach a temperature intermediate between the entering hot gas temperature and that of the stagnant air. The temperature of the air within the nose lip 14 rises until a stable temperature is reached at which heat lost will, by conduction through the skin of the housing 14 and carried off with the exhaust mixture passing though the slots 36, the sum of which will equal the heat being injected by additional hot gas through the nozzle 30. With the enhanced nozzle 34 and the enhanced mixing of the hot, high pressure gas and the air contained within the housing 14, any tendency of the rotating heated air mass to generate an area of elevated temperature in the skin of the nose lip 14 at a location downstream of the site of the nozzle 34 and the initial injection of the hot, high pressure gas will be materially reduced.

Referring again to the enhanced nozzle 34 seen in FIGS. 2, 3, 3A and 5, it will be seen that in the particular embodiment of the invention illustrated in the drawings that the circumferentially arranged means extending aft from the nozzle 34 takes the form of a plurality of circumferentially arranged spaced tab members 38 which are preferably canted inwardly into the flow of hot gas to create spaced vortexes. While in the illustrated embodiment of the invention four such tab members 38 are shown, it is contemplated that a range of 2 to 6 tab members 38 should suffice. Also, the preferred shape of the tab members 38 is triangular or delta-shaped. Asymmetric distribution of tab members around the nozzle periphery is contemplated for preferential modification of the hot jet mixing characteristics.

As seen most clearly in FIG. 3A, the tab members 38 are also canted or angled from the end of the nozzle 34 inwardly a predetermined distance to create the desired vorticity in the hot, high pressure gas stream. The angle Ø that the tab members may be canted into gas stream is preferably chosen from a range of 0–45° with the angle Ø not to exceed 45°. It will be recognized that the angled tab members 38 will tend to slightly restrict the cross-sectional area of the outlet nozzle 34. The invention contemplates that such restriction would not exceed 5% of the normal cross-sectional area and, also, the cross sectional area of the nozzle 34 could be enhanced to compensate fully for any such restriction of such cross-sectional area by such tab members 38.

Figure 7:
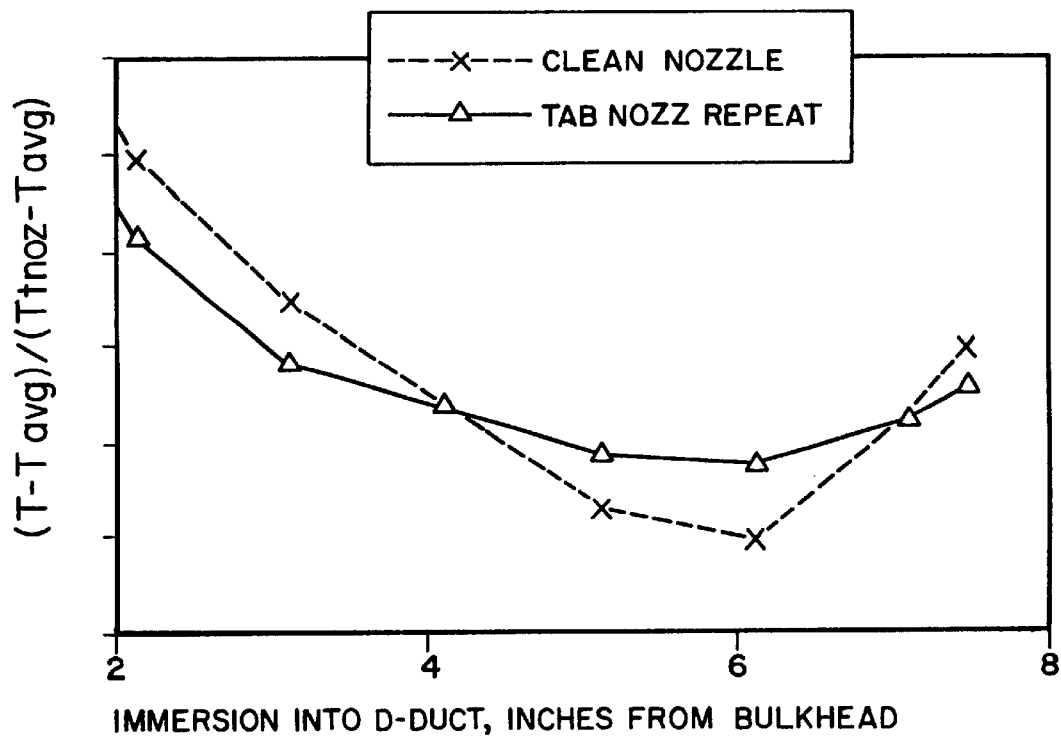
FIG. 7 is a chart illustrating the reduction in the elevated temperature of an area of the nose lip aft of the improved injection nozzle.
Figure 8:
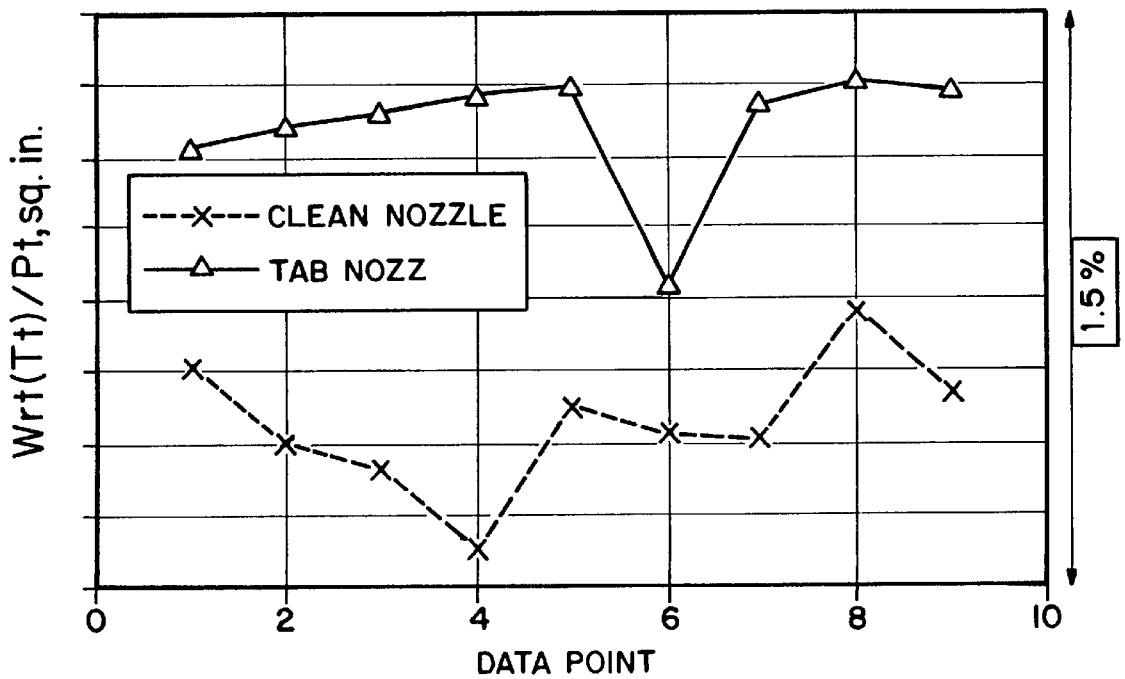
FIG. 8 is a chart illustrating the nozzle area enlargement required to compensate for the tab members of the improved injection nozzle, which enlargement was performed prior to conducting the studies shown in FIG. 7.

Referring now to FIGS. 7 and 8, it will be seen in FIG. 7 that the hot spot temperature is measured by determining the temperature within the nose lip 14 at a position close to the outer portion of the nose lip 14 and at varying immersion points relative to the bulkhead. As seen in FIG. 7, the temperature of the hot spot is materially reduced by use of the improved injection nozzle of the invention, which is termed the "tab nozzle" in the chart, and the uniformity of temperature of the mixed hot gas and air within the D-duct is improved.

As noted above, it is contemplated that the cross-sectional area of the nozzle 34 will be enhanced to compensate fully for any restriction caused by the tab members 38. FIG. 8 demonstrates that the improvement shown in FIG. 7 occurs even after the nozzle area is enlarged to provide a desired compensation for such tabs, which enlargement was provided prior to conducting the studies shown in FIG. 7.

While a converging outlet nozzle has been most frequently used it would be within the scope of the present invention to provide other alternative nozzles, such as those seen in FIGS. 4–7 of U.S. Pat. No. 4,688,745, with the means described herein for improving the mixing of the hot, high pressure gas injected through such nozzle with the swirling rotating air contained within the nose cowl. Similarly, while the exhaust means for the mixed swirling rotational gas and air is shown to be a plurality of suitable slots provided in the nose lip other exhaust means of suitable size could be provided in the practice of this invention. Also, it would be within the scope of this invention to provide the longitudinally extending tab members on each of a plurality of nozzles that may be utilized to inject hot high pressure gas jets as seen in U.S. Pat. No. Re. 36,215. Asymmetric placement of tab members modifying multiple jets issuing from a single nozzle structure would also be advantageous and within the scope of this invention.

It should also be recognized that the present invention will permit reduction in the size of the D-duct and thereby also permit increasing the longitudinal length of the acoustically treated inner barrel.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. An anti-icing system for a nose cowl for an annular inlet of an aircraft jet engine propulsion system for an aircraft which comprises:

a substantially closed annular single skin nose cowl having an exterior surface and an interior surface and positioned at the leading edge of an inlet of an aircraft jet engine propulsion system and arranged for grazing flow of ambient air over the exterior surface when the aircraft is in flight, the annular nose cowl containing a quantity of air;

a source of high pressure hot gas;

at least one conduit means coupled to the source of high pressure hot gas and having an outlet end extending into said nose cowl;

at least one outlet nozzle provided on the outlet end of said conduit means, said outlet nozzle being provided with circumferentially arranged means extending aft from said outlet nozzle and extending into the flow of hot gas issuing from said nozzle to create longitudinal vortices and transverse stirring in the hot gas flow, said outlet nozzle being oriented to eject said hot gas at high velocity in a direction substantially tangential to a centerline of said annular nose cowl, wherein said circumferentially arranged means extending from the outlet end of the conduit means includes a plurality of circumferentially arranged tabs that are canted inwardly into the flow of hot gas issuing from the nozzle, and whereby the turbulent high velocity hot gas flow issuing from said nozzle entrains the air within said annular nose cowl so that the total volume of air and hot gases swirling around the interior of said annular nose cowl in a rotational direction has a substantially uniform temperature intermediate between that of said air and said hot gas flow and by direct contact with the interior surface of the single skin nose cowl substantially uniformly heats the single skin nose cowl to a temperature that is sufficiently high to preclude the formation of ice on the exterior surface of the nose cowl by the grazing flow of ambient air when the aircraft is in flight while also precluding the creation of an area of elevated temperature in said nose cowl at a location downstream of said outlet nozzle.

2. The anti-icing system of claim 1 wherein the annular nose cowl is closed by a transverse bulkhead and an air outlet means is provided in the annular nose cowl to permit a volume of swirling air and hot gas to be exhausted at a rate substantially equal to the mass flow rate of hot gas being injected into the housing through said conduit means.

3. The anti-icing system of claim 1 wherein the outlet nozzle injects a hot stream of gas into the air within the nose cowl at a rate to provide a mass flow rate of the hot gas and air swirling in said annular nose cowl in a rotational direction around the interior of said annular nose cowl and in direct contact with the interior surface of such nose cowl being at least three times the mass flow rate of gases leaving said outlet.

4. The anti-icing system of claim 3 wherein said conduit means enters through said bulkhead and is bent about 90° to said tangential orientation.

5. The anti-icing system of claim 1 wherein the number of circumferentially arranged tabs falls within a range of 2–6.

6. The anti-icing system of claim 5 wherein said circumferentially arranged tabs are triangularly shaped.

7. The anti-icing system of claim 6 wherein the triangularly shaped tabs are canted inwardly into the flow of hot gas at an angle from a sidewall of the outlet nozzle falling between 0–45°.

8. The anti-icing system of claim 7 wherein the triangularly shaped tabs are canted into the flow of hot gas issuing from the outlet nozzle at an angle of around 45°.

9. The anti-icing system of claim 8 wherein the portion of the area of the outlet nozzle that is restricted by the canted triangularly shaped tabs is less that 5%.

10. The anti-icing system of claim 9 wherein the outlet area of the outlet nozzle is enlarged sufficiently to compensate for the restriction of such nozzle by the canted triangularly shaped tabs.

11. An anti-icing system for annular aircraft jet engine housings which comprises:
    a substantially annular single skin housing having an exterior surface and an interior surface and positioned at the leading portion of an aircraft jet engine;
    a bulkhead substantially closing the aft end of said single skin housing;
    a hot, high pressure gas region of a jet engine;
    at least one conduit means adapted to carry hot gas from said region having a temperature of about 500 to 1000 degrees F. and a mass flow rate of up to 1.5 lbm/sec., said at least one conduit means having an outlet end extending into said housing through said bulkhead;
    at least one outlet nozzle provided on said outlet end of each said conduit means, each outlet nozzle being oriented to eject said hot gas at a high velocity in a direction substantial tangential to the centerline of said annular nose cowl and being provided with circumferentially arranged means extending aft from said outlet nozzle and into the flow of hot gas issuing from said nozzle to create longitudinal votices and traverse stirring in said hot gas slow, wherein said circumferentially arranged means extending from the outlet end o the conduit means includes a plurality of circumferentially arranged tabs that are canted inwardly into the flow of hot gas issuing from the nozzle.

12. The anti-icing system of claim 11 that also includes an exhaust means that is sized to permit the exhaust of a volume of swirling air and hot gas from within the annular housing at least equal to the volume of hot gas injected into the annular housing through the outlet nozzle.

13. The anti-icing system of claim 12 wherein the circumferentially arranged means provided on the outlet nozzle comprises a plurality of circumferentially arranged tabs that falls within a range of 2–6.

14. The anti-icing system of claim 13 where the circumferentially arranged tabs are triangularly shaped.

15. The anti-icing system of claim 14 wherein the triangularly shaped tabs are canted inwardly into the flow of hot gas at an angle from a sidewall of the outlet nozzle falling between 0–45°.

16. The anti-icing system of claim 15 where the triangularly shaped tabs are canted into the flow of hot gas issuing from the outlet nozzle at an angle of around 45°.

17. A method of providing an anti-icing system for a nose cowl for an annular air inlet of an aircraft jet engine propulsion system which precludes the creation of a hot spot on such nose cowl in the vicinity of injection of high pressure hot gas into such cowl that comprises the steps of:
    providing a single skin nose cowl positioned at the leading edge of an air inlet having an acoustically treated inner barrel of an aircraft jet engine that is substantially closed by an aft bulkhead to enclose a quantity of air;
    providing a source of high pressure hot gas;
    introducing said high pressure hot gas into the quantity of air enclosed within said nose cowl in a direction substantially tangential to a centerline of said nose cowl to entrain the quantity of gas within the nose cowl to create a volume of mixed hot gas and air swirling in a rotational direction around the interior of said nose cowl at a substantially uniform temperature that is sufficiently high to preclude the formation of ice on an exterior surface of said nose cowl during flight; and
    to create longitudinal vortices and transverse stirring within the flow of high pressure hot gas during its introduction into said quantity of air and thereby enhance the commingling of injected said hot gas and hot quantity of air to preclude the creation of an area of elevated temperature on said nose cowl at a position aft of the point of introduction of said hot gas and permit reduction of the size of the nose cowl and a concomitant increase in the longitudinal size of said acoustically treated inner barrel, wherein said circumferentially arranged means extending from the outlet end of the conduit means includes a plurality of circumferentially arranged tabs that are canted inwardly into the flow of hot as issuing from the nozzle.

18. The method of claim 17 wherein the creation of turbulence within the flow of high pressure hot gas includes the providing circumferentially arranged spaced means that extend into the flow of high pressure hot gas.

19. The method of claim 18 where the step of providing circumferentially arranged spaced means includes the further step of forming such spaced means as triangularly shaped tabs that extend inwardly into the flow of hot gas at a predetermined angle.

* * * * *

UNITED STATES PATENT AND TRADEMARK OFFICE
CERTIFICATE OF CORRECTION

PATENT NO.    : 6,354,538 B1
DATED         : March 12, 2002
INVENTOR(S)   : Radhakrishna Chilukuri Page 1 of 1

It is certified that error appears in the above-identified patent and that said Letters Patent is hereby corrected as shown below:

<u>Column 9,</u>
Line 49, "substantial" should read -- substantially --;
Line 56, "o" should read -- of --.

Signed and Sealed this

Eighteenth Day of March, 2003

JAMES E. ROGAN
*Director of the United States Patent and Trademark Office*